(12) United States Patent
Sasada et al.

(10) Patent No.: US 11,987,732 B2
(45) Date of Patent: May 21, 2024

(54) POLARIZING PLATE AND METHOD FOR MANUFACTURING THE SAME

(71) Applicant: FUJIFILM Corporation, Tokyo (JP)

(72) Inventors: Yasuyuki Sasada, Kanagawa (JP); Kazuya Hisanaga, Kanagawa (JP); Daiki Wakizaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 794 days.

(21) Appl. No.: 17/088,923

(22) Filed: Nov. 4, 2020

(65) Prior Publication Data

US 2021/0047542 A1 Feb. 18, 2021

Related U.S. Application Data

(63) Continuation of application No. PCT/JP2019/019182, filed on May 14, 2019.

(30) Foreign Application Priority Data

| May 15, 2018 | (JP) | 2018-094035 |
| Jun. 27, 2018 | (JP) | 2018-122349 |
| Jul. 11, 2018 | (JP) | 2018-131775 |
| Aug. 20, 2018 | (JP) | 2018-154104 |

(51) Int. Cl.
| C09J 4/00 | (2006.01) |
| B32B 7/023 | (2019.01) |
| B32B 7/06 | (2019.01) |
| B32B 7/12 | (2006.01) |
| B32B 27/36 | (2006.01) |
| C09J 7/25 | (2018.01) |
| C09J 11/06 | (2006.01) |
| G02B 5/30 | (2006.01) |

(52) U.S. Cl.
CPC .............. *C09J 4/00* (2013.01); *B32B 7/023* (2019.01); *B32B 7/06* (2013.01); *B32B 7/12* (2013.01); *B32B 27/36* (2013.01); *C09J 7/255* (2018.01); *C09J 11/06* (2013.01); *B32B 2307/42* (2013.01); *C09J 2301/416* (2020.08); *C09J 2467/006* (2013.01); *G02B 5/3025* (2013.01); *Y10T 428/1476* (2015.01)

(58) Field of Classification Search
None
See application file for complete search history.

(56) References Cited

FOREIGN PATENT DOCUMENTS

| JP | 3-056178 A | | 3/1991 |
| JP | 2004039272 A | * | 6/2002 |
| JP | 2002-331616 A | | 11/2002 |
| JP | 2011-028234 A | | 2/2011 |
| JP | 2013-254072 A | | 12/2013 |
| JP | 2014038180 A | * | 2/2014 |
| JP | 2014-048496 A | | 3/2014 |
| JP | 2016-099597 A | | 5/2016 |
| JP | 2019-95553 A | * | 1/2017 |
| JP | 2018-041079 A | | 3/2018 |
| WO | 2014/199934 A1 | | 12/2014 |
| WO | 2015/099170 A1 | | 7/2015 |
| WO | 2015/141340 A1 | | 9/2015 |
| WO | 2018/047721 A1 | | 3/2018 |

OTHER PUBLICATIONS

JP 2019095553 A English machine Translation (Year: 2017).*
JP 2014038180 A Eng Trans (Year: 2014).*
JP 2004039272 A Eng trans (Year: 2004).*
Office Action, issued by the State Intellectual Property Office dated May 18, 2022, in connection with Chinese Patent Application No. 201980032197.8.
Office Action, issued by the Korean Intellectual Property Office dated Mar. 28, 2023, in connection with Korean Patent Application No. 10-2020-7032523.
Office Action, issued by the State Intellectual Property Office dated Dec. 20, 2021, in connection with Chinese Patent Application No. 201980032197.8.
Office Action, issued by the Japanese Patent Office dated Mar. 1, 2022, in connection with Japanese Patent Application No. 2020-519874.
International Search Report issued in PCT/JP2019/019182 dated Aug. 13, 2019.
Written Opinion issued in PCT/JP2019/019182 dated Aug. 13, 2019.
International Preliminary Report on Patentability completed on Nov. 17, 2020, in connection with International Patent Application No. PCT/JP2019/019182.
Office Action, issued by the Korean Intellectual Property Office dated Aug. 29, 2022, in connection with Korean Patent Application No. 10-2020-7032523.
Office Action, issued by the Japanese Patent Office dated Oct. 12, 2021, in connection with Japanese Patent Application No. 2020-519874.
Decision of Dismissal, issued by the Japanese Patent Office dated Aug. 23, 2022, in connection with Japanese Patent Application No. 2020-519874.
Office Action, issued by the Japanese Patent Office dated Aug. 23, 2022, in connection with Japanese Patent Application No. 2020-519874.
Office Action, issued by the State Intellectual Property Office dated Jan. 10, 2023, in connection with Chinese Patent Application No. 201980032197.8.

* cited by examiner

*Primary Examiner* — Jeffrey D Washville
(74) *Attorney, Agent, or Firm* — Edwards Neils LLC; Jean C. Edwards, Esq.

(57) ABSTRACT

A polarizing plate includes: a polarizer and an optical film, in which the optical film is laminated on at least one surface of the polarizer with an adhesive containing at least one or more polymerizable compounds, and the at least one or more polymerizable compounds are not substantially infiltrated into the optical film.

14 Claims, No Drawings

POLARIZING PLATE AND METHOD FOR MANUFACTURING THE SAME

CROSS-REFERENCE TO RELATED APPLICATIONS

This is a continuation of International Application No. PCT/JP2019/019182 filed on May 14, 2019, which was published under Article 21(2) in Japanese, and which claims priority under 35 U.S.C. § 119(a) from Japanese Patent Application No. 2018-094035 filed on May 15, 2018, Japanese Patent Application No. 2018-122349 filed on Jun. 27, 2018, Japanese Patent Application No. 2018-131775 filed on Jul. 11, 2018, and Japanese Patent Application No. 2018-154104 filed on Aug. 20, 2018. The above applications are hereby expressly incorporated by reference, in their entirety, into the present application.

BACKGROUND OF THE INVENTION

1. Field of the Invention

The present invention relates to a polarizing plate and a method for manufacturing the same.

2. Description of the Related Art

Optical films are used for various applications and are used for polarizing plates as one of various applications.

A polarizing plate is used as a member of a liquid crystal display (LCD) device, an organic electroluminescent diode (organic EL) display (OLED), and the like and plays an important role in display performance. An ordinary polarizing plate has a configuration in which an optical film is laminated on one surface or both surfaces of a polarizer of a polyvinyl alcohol (PVA)-based resin processed for adsorption alignment with a dichroic dye such as an iodine complex or the like.

In recent years, an increase in size, a reduction in thickness, and flexibilization of a display device have proceeded. Accordingly, a polarizing plate is required to have a function different from that of the related art and is also required to be thin.

In order to reduce the thickness of a polarizing plate, it is required to reduce the thickness of an optical film constituting the polarizing plate. For example, WO2014/199934A discloses a method in which a coating film is provided on a temporary support, a polarizer is laminated on the coating film, and the temporary support is then peeled off from the coating film to prepare a polarizing plate having a coating film with a film thickness of less than 10 μm laminated thereon.

In a case where a thin polarizing plate is laminated with a water glue-based adhesive that has been conventionally used, since the polarizer expands and contracts with the inflow and outflow of water, for example, there is a problem that the curling of the polarizing plate may deteriorate. As a countermeasure, a curable adhesive containing a polymerizable compound is being replaced.

SUMMARY OF THE INVENTION

On the other hand, in a case of using a curable adhesive, it was found that the moisture-heat resistance was significantly deteriorated depending on the combination of the adhesive and the optical film.

In view of the above problems, an object of the present invention is to provide a polarizing plate using a curable adhesive, which is excellent in moisture-heat resistance, and a display device.

The present inventors have found that the above object can be achieved by controlling the permeability of an adhesive into an optical film and the light absorption wavelength of the constituting material.

Specifically, it has been found that the above-mentioned object can be achieved by the following means.

[1] A polarizing plate comprising a polarizer, and an optical film, in which the optical film is laminated on at least one surface of the polarizer with an adhesive containing at least one or more polymerizable compounds, and the at least one or more polymerizable compounds are not substantially infiltrated into the optical film.

[2] The polarizing plate according to [1], in which a content rate of a polymerizable compound having a difference in SP value of less than 0.3 $MPa^{0.5}$ with respect to a main component of the optical film among the at least one or more polymerizable compounds is less than 50% by mass with respect to the adhesive, the SP value being determined by Hoy's method.

[3] The polarizing plate according to [1] or [2], in which a minimum value of a difference between an SP value of the at least one or more polymerizable compounds determined by Hoy's method and an SP value of a main component of the optical film determined by Hoy's method is 0.3 $MPa^{0.5}$ or more.

[4] The polarizing plate according to any one of [1] to [3], in which the at least one or more polymerizable compounds contain at least one or more cationic polymerizable compounds.

[5] The polarizing plate according to any one of [1] to [4], in which a main component of the optical film has an SP value of 20 $MPa^{0.5}$ or less, the SP value being determined by Hoy's method.

[6] The polarizing plate according to any one of [1] to [5], in which a peelable substrate film is provided on a surface of the optical film, opposite to a side on which the adhesive is provided, the adhesive contains at least one or more photoinitiators, and among absorption peaks of the at least one or more photoinitiators, a maximum absorption wavelength on a longest wavelength side is longer than an absorption edge wavelength on a short wavelength side of a peelable laminated film in which the optical film and the peelable substrate film are laminated.

[7] The polarizing plate according to any one of [1] to [5], in which a peelable substrate film is provided on a surface of the optical film, opposite to a side on which the adhesive is provided, the adhesive contains at least one or more photoinitiators, among absorption peaks of the at least one or more photoinitiators, a maximum absorption wavelength on a longest wavelength side is equal to or shorter than an absorption edge wavelength on a short wavelength side of a peelable laminated film in which the optical film and the peelable substrate film are laminated, and the adhesive contains a sensitizer.

[8] The polarizing plate according to [6], in which the adhesive contains at least two photoinitiators, and at least one of the at least two photoinitiators is a photoinitiator in which the maximum absorption wavelength on the longest wavelength side is longer than the absorption edge wavelength on the short wavelength side of the peelable laminated film among the absorption peaks of the at least two photoinitiators.

[9] The polarizing plate according to [7] or [8], in which a main component of the peelable substrate film is a polyester resin.

[10] A method for manufacturing the polarizing plate according to any one of [1] to [9], the method comprising:
laminating the optical film on the polarizer with the adhesive to provide a laminate and then irradiating the laminate with an active energy ray.

[11] A method for manufacturing the polarizing plate according to any one of [6] to [9], the method comprising:
laminating a surface of the optical film, opposite to an interface on a peelable substrate film side, on the polarizer with the adhesive to provide a laminate, then irradiating the laminate with an active energy ray from the peelable substrate film side, and further, peeling off the peelable substrate film.

[12] The method for manufacturing the polarizing plate according to [10] or [11], in which the optical film and the adhesive are brought into contact with each other and after 0.1 to 30 seconds, the laminate is irradiated with the active energy ray.

Although the mechanism for achieving the above object by the present invention has not been completely clarified, the present inventors have presumed that the deterioration of the moisture-heat resistance is considered to be caused by a) deterioration of the properties of an optical film (the barrier properties of an ionic compound) due to the infiltration of a polymerizable compound, b) an increase in the amount of an uncured polymerizable compound that deteriorates moisture-heat resistance due to infiltration (since the concentration of a polymerizable compound is decreased due to mixing with a film material and the contact probability with an initiator or other polymerizable compounds is decreased, the reaction rate is decreased), and the like, and the polymerizable compound is not substantially infiltrated into the optical film so that the moisture-heat resistance is improved.

Particularly, the inventions described in [2] to [5] and [12] above are preferable from the viewpoint of suppressing infiltration (related to a) above).

In addition, the inventions described in [6] to [8] above are preferable from the viewpoint of improving the moisture-heat resistance by accelerating the curing of the polymerizable compound (related to b) above).

In order to suppress infiltration, it is effective to adjust a difference in SP value between the optical film and the polymerizable compound (reduce the proportion of the polymerizable compound having a close SP value and too high permeability), increase the viscosity of the polymerizable compound, reducing the waiting time until a curing reaction, and lower the temperature during waiting. In order to accelerate curing, it is effective to suppress infiltration, perform irradiation with an active energy ray not absorbed by the peelable laminated film, and select an initiator and a sensitizer suitable for the above wavelength.

The following inventions are also described in the specification.

<1> A polarizing plate including: a polarizer, and an optical film, in which the optical film is laminated on at least one surface of the polarizer with an adhesive containing at least one or more polymerizable compounds, and the polymerizable compound is not substantially infiltrated into the optical film.

<2> The polarizing plate according to <1>, in which among each of the polymerizable compound constituting the adhesive, a content rate of a polymerizable compound having a difference in SP value ($\Delta SP1$) of less than 0.4 $MPa^{0.5}$ with respect to a main component constituting the optical film is less than 50 parts by mass with respect to the adhesive, the SP value being determined by Hoy's method.

<3> The polarizing plate according to <1> or <2>, in which a minimum value ($\Delta SP1$ min) of a difference between an SP value of the polymerizable compound determined by Hoy's method and an SP value of a main component constituting the optical film determined by Hoy's method is 0.4 $MPa^{0.5}$ or more.

<4> The polarizing plate according to any one of <1> to <3>, in which the polymerizable compound includes at least one or more cationic polymerizable compounds, and the most infiltrated polymerizable compound is a cationic polymerizable compound.

<5> The polarizing plate according to any one of <1> to <4>, in which the most infiltrated polymerizable compound has a viscosity of 0.1 to 50 cP.

<6> The polarizing plate according to any one of <1> to <5>, in which the optical film has a specific gravity of less than 1.18.

<7> The polarizing plate according to any one of <1> to <6>, in which a main component of the optical film has an SP value of 20 $MPa^{0.5}$ or less, the SP value being determined by Hoy's method.

<8> The polarizing plate according to any one of <1> to <7>, in which the optical film has a thickness of 0.1 to 10 μm.

<9> The polarizing plate according to any one of <1> to <8>, in which the resin contained in the optical film includes at least one selected from a styrene-based resin and a polymer of a compound having a cyclic aliphatic hydrocarbon group and a group having an ethylenically unsaturated double bond.

<10> The polarizing plate according to <9>, in which the compound having a cyclic aliphatic hydrocarbon group and a group having an ethylenically unsaturated double bond is a compound having a structure represented by Formula (I),

Formula (I)

in Formula (I), $L_1$ and $L_2$ each independently represent a single bond or a divalent or higher valent linking group, and n represents an integer of 1 to 3.

<11> The polarizing plate according to <9>, in which the resin contained in the optical film contains a copolymer containing butadiene in an amount of 25% to 45% by mass with respect to a total mass of the optical film.

<12> The polarizing plate according to any one of <1> to <11>, in which the optical film is a peelable laminated film including a peelable substrate film, the adhesive contains at least one or more photoinitiators, and among the absorption peaks of the photoinitiator, the maximum absorption wavelength on the longest wavelength side is longer than the absorption edge wavelength on the short wavelength side of the optical film.

<13> The polarizing plate according to any one of <1> to <12>, in which the optical film is a peelable laminated film including a peelable substrate film, the adhesive contains at least one or more photoinitiators, among the absorption peaks of the photoinitiator, the maximum absorption wavelength on the longest wavelength side is equal to or shorter than the absorption edge wavelength on the short wavelength side of the optical film, and the adhesive contains a sensitizer.

<14> The polarizing plate according to any one of <1> to <13>, in which the adhesive contains at least two or more photoinitiators, at least one of the photoinitiators is the photoinitiator described in <12>, and at least one other photoinitiator is the photoinitiator described in <13>.

<15> The polarizing plate according to any one of <12> to <14>, in which a main component of the peelable substrate film is a polyester resin.

<16> The polarizing plate according to any one of <12> to <15>, in which stress in a case where the substrate film is peeled off from the optical film is 0.05 to 2.00 N/25 mm.

<17> The polarizing plate according to any one of <12> to <16>, in which the optical film contains a polyester component in an amount of 0.01% to 1% by mass with respect to a total mass of the optical film.

<18> The polarizing plate according to any one of <12> to <17>, in which the peelable substrate film has a surface roughness (Ra) of 40 nm or less.

<19> A display device including: the polarizing plate according to any one of <1> to <18>.

<20> A method for manufacturing a polarizing plate including: a step of laminating the optical film of the polarizing plate according to any one of <1> to <18> on the polarizer with the adhesive and then irradiating the laminate with an active energy ray.

<21> A method for manufacturing a polarizing plate including: a step of laminating a surface of the peelable laminated film of the polarizing plate according to any one of <12> to <18> opposite to an interface on the substrate film side on the polarizer with the adhesive, then irradiating the laminate with an active energy ray from the substrate film side, and peeling off the substrate film.

<22> The method for manufacturing a polarizing plate according to <20> or <21>, in which the optical film and the adhesive are brought into contact with each other, and after 0.1 to 30 seconds, the laminate is irradiated with the active energy ray.

According to the present invention, it is possible to provide a polarizing plate having a high adhesiveness between a polarizer and an optical film and having excellent durability even in a high temperature and high humidity environment or the like.

DESCRIPTION OF THE PREFERRED EMBODIMENTS

The contents of the present invention will be described in detail. The description of the constitution requirements described below may be made based on a representative embodiment of the present invention, but the present invention is not limited to such an embodiment. A numerical range shown by "to" used in the specification means a range including the numerical values described before and after "to" as a lower limit and an upper limit, respectively.

(Polarizing Plate)

A polarizing plate according to an embodiment of the present invention is a polarizing plate including a polarizer, and an optical film, in which the optical film laminated on at least one surface of the polarizer with an adhesive containing at least one or more polymerizable compounds, and the polymerizable compound is not substantially infiltrated into the optical film.

The fact that the polymerizable compound is not substantially infiltrated into the optical film means that the polymerizable compound may be slightly infiltrated into the optical film within a range that does not affect the external appearance and performance of the film. For example, among the above-mentioned polymerizable compounds that are infiltrated into the optical film, a polymerizable compound having a maximum infiltration depth of 0.001 to 3 μm is also included. The infiltration depth is preferably 0.005 to 1 μm, and more preferably 0.01 to 0.5 μm.

In the present invention, the surface of the optical film opposite to the side on which the adhesive is provided is measured by ATR-IR to determine the infiltration state of the adhesive. In a case where the absorption peak derived from the adhesive is not detected, it is determined that the polymerizable compound is not substantially infiltrated into the optical film. ATR is an abbreviation for Attenuated Total Reflection. and IR is an abbreviation for infrared spectroscopy. Specifically, evaluation can be carried out by mounting an ATR prism consisting of Ge, KRS-5, diamond, ZnSe, or the like (for example, MKII Golden Gate Single Reflection ATR System, manufactured by Specac Ltd.) on a Fourier transform infrared spectrometer (for example, NICOLET 6700, manufactured by Thermo Fisher Scientific), performing measurement in a reflection mode, and observing the characteristic absorption peak area.

(Polarizer)

The polarizer is not particularly limited, and for example, a film obtained by immersing a polyvinyl alcohol film immersed in an iodine solution and stretching the film, a film obtained by applying a dichroic dye and performing an alignment treatment, and the like can be used. Specifically, a film containing an iodine-polyvinyl alcohol complex or the like can be used as the polarizer.

(Adhesive)

The adhesive is an adhesive containing at least one polymerizable compound. The polymerizable compound preferably contains at least one cationic polymerizable compound.

It is preferable that the adhesive contains a cationic polymerizable compound and an acid generator (so-called initiator). In addition, in order to increase the curing rate, it is also preferable to add a sensitizer, and heating may be performed after irradiation with an active energy ray. Further, in a case where the optical film is a peelable laminated film including a peelable substrate film, the film may be additionally irradiated with an active energy ray after the peelable substrate film is appropriately peeled off.

As the compound of the adhesive or the sensitizer, general compounds can be used, and specific examples of the cationic polymerizable compound and the acid generator (initiator) are described in [0014] to [0066] of JP2018-041079A. and the like. Further, specific examples of the sensitizer include anthracene type sensitizers ([0103] of JP2018-025771A), thioxanthone type sensitizers, and the like. Two or more of these initiators and sensitizers can be selected and used in combination.

From the viewpoint of suppressing infiltration and securing close attachment, a content rate of a polymerizable compound having a difference in SP value (ΔSP1) of less than 0.3 MPa$^{0.5}$ with respect to the main component of the optical film (among the components constituting the optical film, a component having the highest content rate on a mass basis) among the polymerizable compounds contained in the adhesive, the SP value being determined by Hoy's method, is preferably less than 50% by mass, more preferably 0% to 30% by mass, and even more preferably 1% to 15% by mass with respect to the adhesive.

From the viewpoint of suppressing infiltration and securing close attachment, the minimum value (ΔSP1min) of the difference between the SP value of the polymerizable compound contained in the adhesive determined by Hoy's method and the SP value of the main component constituting the optical film determined by Hoy's method is preferably 0.3 $MPa^{0.5}$ or more, more preferably 0.7 to 2.0 $MPa^{0.5}$, and even more preferably 1.0 to 19 $MPa^{0.5}$.

The viscosity (viscosity at 23° C.) of the polymerizable compound is preferably 0.1 to 50 cP, more preferably 0.5 to 30 cP, and even more preferably 1 to 20 cP.

Note that 1 cP is 0.001 Pa·s.

(Optical Film)

The optical film included in the polarizing plate according to the embodiment of the present invention will be described.

The total light transmittance of the optical film for visible light (wavelength of 380 to 780 nm) is preferably 80% or more, more preferably 82% or more, and even more preferably 85% or more.

It is preferable that the main component of the optical film (the component having the highest content rate on a mass basis among the components constituting the optical film) has an SP value of 20 $MPa^{0.5}$ or less, the SP value being determined by Hoy's method.

<Thickness of Optical Film>

The thickness of the optical film is not particularly limited, and is preferably 0.1 to 10 μm, more preferably to 9 μm, and even more preferably 3 to 6 μm.

<Retardation of Optical Film>

In the present invention, Re and Rth represent an in-plane retardation and a thickness direction retardation at a wavelength of 590 nm, respectively.

In the present invention, Re and Rth are values measured by AxoScan OPMF-1 (manufactured by Optoscience, Inc.) at a wavelength of 590 nm. By inputting the average refractive index ((nx+ny+nz)/3) and the film thickness (d) into the AxoScan, a slow axis direction (°)

$Re=(nx-ny)\times d$ $Rth=((nx+ny)/2-nz)\times d$ are calculated.

nx represents a refractive index in the slow axis direction of the film, ny represents a refractive index in the fast axis direction of the film, and nz represents a refractive index in the thickness direction of the film.

The retardation of the optical film used in the polarizing plate according to the embodiment of the present invention is not particularly limited, and in a case where the optical film is used in an IPS mode liquid crystal display device, Re is preferably 0 to 20 nm, more preferably 0 to 10 nm, and even more preferably 0 to 5 nm. The Rth of the optical film used for the polarizing plate according to the embodiment of the present invention is preferably −25 to 25 rm, more preferably −20 to 5 nm, and even more preferably −10 to 0 nm in a case where the pretilt angle of the liquid crystal compound inside the IPS mode liquid crystal cell is larger than 1.0°. In a case where the pretilt angle of the liquid crystal compound inside the IPS mode liquid crystal cell is 1.0° or less, the above Rth is preferably −5 to 30 nm, and more preferably 0 to 20 nm. In a case where the Re and Rth of the optical film used for the polarizing plate according to the embodiment of the present invention are in the above ranges, light leakage from an oblique direction is further improved, and display quality can be improved.

<Other Characteristics>

The characteristic values of the optical film other than those described above are not particularly limited. The performance equivalent to that of a known typical polarizing plate protective film may be implemented, and the performance required for a so-called inner film arranged between the polarizer and the liquid crystal cell in the liquid crystal display device is preferably implemented. Specific examples of the characteristic values include the haze related to display characteristics, the spectral characteristics, the retardation, and the moisture-heat resistance of the retardation, the dimensional change rate accompanied by the moisture heat thermo related to mechanical characteristics or polarizing plate processing suitability, the glass transition temperature, the equilibrium moisture absorptivity, the moisture permeability, and the contact angle.

<Layer Configuration>

The optical film may be formed of a single layer, may have a laminated structure of two or more layers, and may further have a functional layer. However, it is preferable that the optical film satisfies the above characteristics excluding the functional layer. The optical film is preferably formed of a single layer.

<Resin>

The optical film preferably contains at least one kind of resin.

The resin contained in the optical film will be described.

The resin contained in the optical film is not particularly limited, but it is preferable that the SP value (solubility parameter value) determined by the Hoy's method is 20 $MPa^{0.5}$ or less from the viewpoint of securing the barrier properties of an ionic compound having an effect of improving the moisture-heat resistance of the polarizing plate. Further, from the viewpoint of securing adhesiveness, the specific gravity is preferably less than 1.18. The SP value determined by Hoy's method is calculated from the molecular structure of the resin by the method described in Polymer Handbook fourth edition. In addition, in a case where the resin is a mixture of a plurality of kinds of resins, the SP value is obtained by calculating the SP value of each constitutional unit.

More specifically, the optical film is scraped off with a razor, the molecular structure is analyzed by pyrolysis gas chromatography (GC)/mass spectrometry (MS), and the compositional ratio is analyzed by nuclear magnetic resonance (NMR).

The resin may be a linear resin or a mesh resin.

Specific examples of the resin include polystyrene-based resins, epoxy resins, poly methyl methacrylate resins (PMMA), and polymers of compounds having a group having an ethylenically unsaturated double bond. From the viewpoint of moisture-heat resistance as a polarizing plate protective film, a resin containing at least one selected from a polystyrene-based resin and a polymer of a compound having a cyclic aliphatic hydrocarbon and a group having an ethylenically unsaturated double bond is more preferable.

(Styrene-Based Resin)

The styrene-based resin represents a resin in which the monomer unit having the highest ratio among the monomer units constituting the resin is a monomer unit derived from a styrene-based monomer. For example, in a case of a two-component resin, the resin refers to a resin containing 50% by mass or more of a monomer unit derived from a styrene-based monomer. Here, the styrene-based monomer means a monomer having a styrene skeleton in its structure.

The styrene-based resin preferably contains 70% by mass or more, and more preferably 85% by mass or more of a monomer unit derived from a styrene-based monomer.

A specific example of the styrene-based monomer may be a homopolymer of styrene or a derivative thereof, or a binary or higher copolymer of styrene or a derivative thereof and another copolymerizable monomer. Here, the styrene derivative is a compound prepared by bonding styrene with another group, and examples thereof include alkylstyrene such as o-methylstyrene, m-methylstyrene, p-methylstyrene, 2,4-dimethylstyrene, o-ethylstyrene, or p-ethylstyrene, and substituted styrene having a hydroxyl group, an alkoxy group, a carboxyl group, or a halogen introduced into the benzene nucleus of styrene, such as hydroxystyrene, tert-butoxystyrene, vinyl benzoic acid, o-chlorostyrene and p-chlorostyrene.

The styrene-based resin also includes a copolymer obtained by copolymerizing a styrene-based monomer component with another monomer component. Examples of the copolymerizable monomer include unsaturated carboxylic acid alkyl ester monomers including alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, 2-ethylhexyl acrylate, and cyclohexyl acrylate; unsaturated carboxylic acid monomers such as methacrylic acid, acrylic acid, itaconic acid, maleic acid, fumaric acid, and cinnamic acid; unsaturated dicarboxylic acid anhydride monomers as maleic acid anhydride, itaconic acid, ethylmaleic acid, methyl itaconic acid, chloromaleic acid, and the like; unsaturated nitrile monomers such as acrylonitrile, and methacrylonitrile, and conjugated dienes such as 1,3-butadiene, 2-methyl-1,3-butadiene (isoprene), 2,3-dimethyl-1,3-butadiene, 1,3-pentadiene, and 1,3-hexadiene, and two or more of these can be copolymerized.

As the styrene-based resin, a plurality of kinds of styrene-based resins having different compositions, molecular weights and the like may be used in combination.

The styrene-based resin can be obtained by a known anion, bulk, suspension, emulsion or solution polymerization method. In addition, in the polystyrene-based resin, the unsaturated double bond of the benzene ring of the conjugated diene or the styrene-based monomer may be hydrogenated. The hydrogenation rate can be measured by a nuclear magnetic resonance apparatus (NMR).

The weight-average molecular weight (Mw) of the resin used for the optical film is not particularly limited and is preferably 3,000 to 1,000,000, and more preferably 10,000 to 500,000.

The weight-average molecular weight of the resin is obtained by measuring weight-average molecular weight (Mw) in terms of standard polystyrene and molecular weight distribution (Mw/Mn) under the following conditions. Mn is number average molecular weight in terms of standard polystyrene.

GPC: gel permeation chromatograph apparatus (HLC-8220GPC, manufactured by Tosoh Corporation), column; guard columns HXL-H, TSK gel G7000HXL, two columns of TSK gel GMHXL, TSK gel G2000HXL, manufactured by Tosoh Corporation, sequentially linked together, eluent; tetrahydrofuran, flow rate; 1 mL/min, sample concentration; 0.7% to 0.8% by mass, sample injection amount; 70 mL, measurement temperature; 40° C. detector; differential refractometer (RI) meter (40° C.), constitution curve; calibration curve obtained from seven samples of TSK standard polystyrene manufactured by TOSOH Corporation, of which Mw=28000 to 1050 (Mw/Mn=1.03 to 1.06), used).

For the resin used for the optical film, one kind may be included or two or more kinds may be included. In a case where the optical film is formed of multiple layers, the resin of each layer may be the same as or different from each other.

The content of the resin in the optical film is preferably 50% by mass or more, more preferably 60% by mass or more, and even more preferably 70% by mass or more with respect to the total mass of the optical film. The content of the resin in the optical film is preferably 99.5% by mass or less with respect to the total mass of the optical film.

(Compound Having Group Having Cyclic Aliphatic Hydrocarbon Group and Ethylenically Unsaturated Double Bond)

The cyclic aliphatic hydrocarbon group is preferably a group derived from an alicyclic compound having 7 or more carbon atoms, more preferably a group derived from an alicyclic compound having 10 or more carbon atoms, and even more preferably a group derived from an alicyclic compound having 12 or more carbon atoms.

The cyclic aliphatic hydrocarbon group is particularly preferably a group derived from a polycyclic compound such as a bicyclic or tricyclic compound.

More preferable are a center skeleton of a compound disclosed in claims of JP2006-215096A, a center skeleton of a compound disclosed in JP2001-010999A, a skeleton of an adamantane derivative, and the like.

Specific examples of the cyclic aliphatic hydrocarbon group include a norbornane group, a tricyclodecane group, a tetracyclododecane group, a pentacyclopentadecane group, an adamantane group, and a diamantane group.

The compound having a cyclic aliphatic hydrocarbon group and a group having an ethylenically unsaturated double bond preferably has two or more groups having an ethylenically unsaturated double bond in the molecule.

The cyclic aliphatic hydrocarbon group (including a linking group) is preferably a group represented by any one of Formulae (I) to (V), more preferably a group represented by Formula (I), (II) or (IV), and even more preferably a group represented by Formula (I).

That is, the compound having a cyclic aliphatic hydrocarbon group and a group having an ethylenically unsaturated double bond is preferably a compound having a structure represented by any one of Formulae (I) to (V), more preferably a compound having a structure represented by Formula (I), (II), or (IV), and even more preferably a compound having a structure represented by Formula (I).

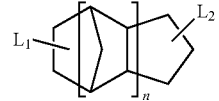

Formula (I)

In Formula (I), $L_1$ and $L_2$ each independently represent a single bond or a divalent or higher valent linking group, and n represents an integer of 1 to 3.

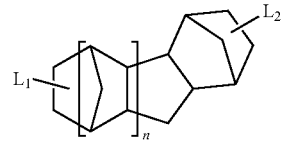

Formula (II)

In Formula (II), $L_1$ and $L_2$ each independently represent a single bond or a divalent or higher valent linking group. n represents an integer of 1 or 2.

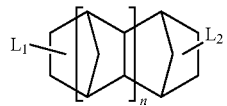

Formula (III)

In Formula (III), $L_1$ and $L_2$ each independently represent a single bond or a divalent or higher valent linking group. n represents an integer of 1 or 2.

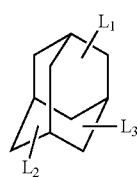

Formula (IV)

In Formula (IV), $L_1$ and $L_2$ each independently represent a single bond or a divalent or higher valent linking group, and $L_3$ represents a hydrogen atom, a single bond or a divalent or higher valent linking group.

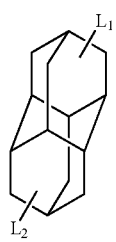

Formula (V)

In Formula (V), $L_1$ and $L_2$ each independently represent a single bond or a divalent or higher valent linking group.

Examples of the divalent or higher valent linking group for $L_1$, $L_2$ and $L_3$ include an alkylene group having 1 to 6 carbon atoms which may be substituted, an amide bond which may be substituted at the N-position, a urethane bond which may be substituted at the N-position, an ester group, an oxycarbonyl group, an ether bond, and a group obtained by combining two or more thereof.

The compound having a cyclic aliphatic hydrocarbon group and a group having two or more ethylenically unsaturated double bonds in the molecule is constituted by bonding the cyclic aliphatic hydrocarbon group to the group having ethylenically unsaturated double bonds through a linking group.

Such a compound can be easily synthesized, for example, by a one-step or two-step reaction of a polyol, such as diol or triol, having the cyclic aliphatic hydrocarbon group, with a carboxylic acid, a carboxylic acid derivative, an epoxy derivative, an isocyanate derivative, or the like, of a compound having a (meth)acryloyl group, a vinyl group, a styryl group, an allyl group, or the like.

Preferably, the above compound may be synthesized through the reaction with a polyol having the cyclic aliphatic hydrocarbon group by using a compound such as (meth) acrylic acid, (meth)acryloyl chloride, (meth)acrylic acid anhydride and glycidyl (meth)acrylate, or a compound described in WO2012/000316A (for example, 1,1-bis(acryloyloxymethyl)ethyl isocyanate).

Preferable specific examples of the compound having the cyclic aliphatic hydrocarbon group and having the group having ethylenically unsaturated double bonds are shown below, but the present invention is not limited to these examples M-1
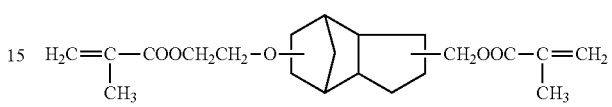

M-2
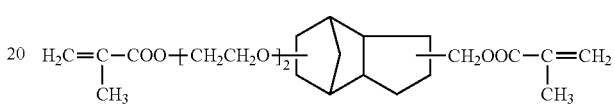

M-3
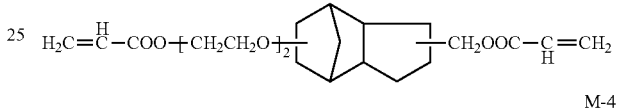

M-4
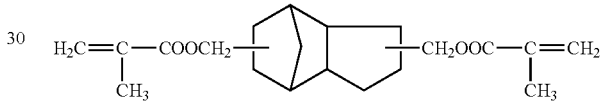

M-5
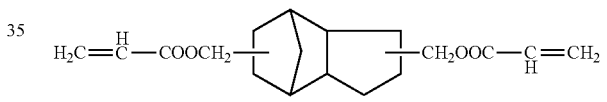

M-6
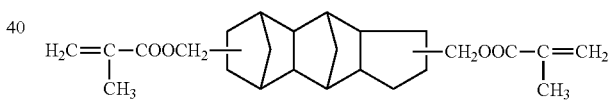

<Other Additives>

Known additives can be formulated to the optical film. As an agent for adjusting adhesion between the optical film and the substrate film, an additive for adjusting the surface energy of the front surface or the back surface of the optical film added for the purpose of controlling the adhesiveness in a case of laminating the optical film and other members, and known additives, a low molecular weight plasticizer, an oligomeric plasticizer, a retardation modifier, a matting agent, an ultraviolet absorber, a deterioration inhibitor, a peeling accelerator, an infrared absorber, an antioxidant, a filler, a compatibilizer, a dye, and the like may be used. The kind and amount of each material are not particularly limited as long as the effects of the present invention can be obtained. Further, in a case where the optical film is formed of multiple layers, the kind and amount of the additive in each layer may be different.

As a preferable embodiment of the polarizing plate of the present invention, an embodiment in which the surface of the optical film opposite to the side on which the adhesive is provided has a peelable substrate film, the adhesive contains at least one or more photoinitiators, and among the absorption peaks of the photoinitiator, the maximum absorption wavelength on the longest wavelength side is longer than the absorption edge wavelength on the short wavelength side of the peelable laminated film in which the optical film and the peelable substrate film are laminated may be exemplified.

The adhesive contains at least two photoinitiators, and at least one of the photoinitiators is preferably a photoinitiator in which the maximum absorption wavelength on the longest wavelength side is longer than the absorption edge wavelength on the short wavelength side of the peelable laminated film among the absorption peaks of the photoinitiator.

In addition, as another preferable embodiment of the polarizing plate of the present invention, an embodiment in which the surface of the optical film opposite to the side on which the adhesive is provided has a peelable substrate film, the adhesive has at least one or more photoinitiators, among the absorption peaks of the photoinitiator, the maximum absorption wavelength on the longest wavelength side is equal to or shorter than the absorption edge wavelength on the short wavelength side of the peelable laminated film in which the optical film and the peelable substrate film are laminated, and the adhesive contains a sensitizer may be exemplified.

(Peelable Laminated Film)

A peelable laminated film in which an optical film and a peelable substrate film are laminated (also simply referred to as "substrate film") w % ill be described.

The peelable laminated film is preferably a peelable laminated film which is a laminate including a substrate film containing polyethylene terephthalate and an optical film,
  in which the substrate film and the optical film are in direct contact with each other,
  the optical film has a thickness of 0.1 to 10 µm, and
  the optical film contains a resin having a solubility parameter value of 19 to 21 $(J/cm^3)^{0.5}$.

The substrate film of the peelable laminated film according to the embodiment of the present invention can be peeled off from the optical film. The stress in a case where the substrate film is peeled off from the optical film is preferably 0.05 N/25 mm or more and 2.00 N/25 mm or less, more preferably 0.08 N/25 mm or more and 0.50 N/25 mm or less, and even more preferably 0.11 N/25 mm or more and 0.20 N/25 mm or less.

In a case where the stress is 0.05 N/25 mm or more, peeling is less likely to occur during the polarizing plate processing process, and thus this case is preferable. In a case where the stress is 2.00 N/25 mm or less, breakage is less likely to occur in the polarizing plate in a case of peeling off the substrate film, and thus this case is preferable.

The stress in a case of peeling off the substrate film of the peelable laminated film from the optical film was evaluated by after laminating and fixing the surface of the optical film of the peelable laminated film cut into a size of a width of 25 mm and a length of 80 mm to a glass substrate through an acrylic pressure sensitive adhesive sheet, gripping the substrate film at one end (one side having a width of 25 mm) of a test piece in a longitudinal direction using a tensile tester (RTF-1210 manufactured by A&D Co., Ltd.), and subjecting the film to a 90° peeling test (in accordance with JIS K 6854-1:1999 "Adhesives-Determination of peel strength of bonded assemblies-Part 1: 90-degree peel") under an atmosphere of a temperature of 23° C. and a relative humidity of 60% at a crosshead speed (grip moving speed) of 200 mm/min.

(Substrate Film)

The substrate film of the peelable laminated film will be described.

The substrate film of the peelable laminated film is not particularly limited, but the main component of the substrate film (the component having the largest content rate on a mass basis among the components constituting the substrate film) is preferably a polyester resin.

The substrate film preferably contains polyethylene terephthalate (PET).

From the viewpoint of the mechanical strength of the substrate, the weight-average molecular weight of PET contained in the substrate film is preferably 20.000 or more, more preferably 30.000 or more, and even more preferably 40,000 or more.

The weight-average molecular weight of PET was determined by dissolving the substrate film in hexafluoroisopropanol (HFIP) and using the above-mentioned GPC method.

The thickness of the substrate film is not particularly limited and is preferably 5 to 100 µm, more preferably 10 to 75 µm, and even more preferably 15 to 55 µm.

The substrate film may be subjected to a corona treatment, a glow discharge treatment, undercoating, or the like as a known surface treatment.

(Method for Manufacturing Peelable Laminated Film)

The method for manufacturing the peelable laminated film will be described.

The peelable laminated film is preferably manufactured by applying a solution containing the above resin and a solvent onto the above substrate film and drying the solution to form an optical film. The solvent can be appropriately selected from the viewpoints such that the resin can be dissolved or dispersed therein; that uniform surface properties are easily obtained in a coating step and a drying step; that liquid preservability can be secured; and that the solvent has a suitable saturated vapor pressure. It is not necessary to surface-treat the substrate film before applying the resin solution for forming the optical film.

In the polarizing plate according to the embodiment of the present invention, the optical film may be further laminated on the surface opposite to the surface on which the optical film is laminated in the polarizer, or a conventionally known optical film may be laminated thereon.

(Method for Manufacturing Polarizing Plate)

A method for manufacturing the polarizing plate according to the embodiment of the present invention preferably includes a step of laminating the optical film on the polarizer with the adhesive to provide a laminate and then irradiating the laminate with an active energy ray.

The method for manufacturing the polarizing plate according to the embodiment of the present invention preferably includes a step of laminating a surface of the optical film opposite to an interface on a peelable substrate film side on the polarizer with the adhesive to provide a laminate, then irradiating the laminate with an active energy ray from the peelable substrate film side, and further peeling off the peelable substrate film.

In addition, it is preferable that the optical film and the adhesive are brought into contact with each other and after 0.1 to 30 seconds, the laminate is irradiated with the active energy ray.

The method for manufacturing the polarizing plate according to the embodiment of the present invention is preferably a method for manufacturing a polarizing plate in which after the surface of the optical film of the peelable laminated film according to the embodiment of the present invention opposite to the interface on the substrate film side is laminated on the polarizer with the adhesive, the substrate film is peeled off to obtain a polarizing plate having the polarizer and the optical film. The infiltration depth into the optical film varies depending on the aging conditions (temperature, time) after the contact between the adhesive and the optical film, as well as a difference in the SP value between the adhesive and the optical film. For example, the conditions of low temperature and short time is suitable for suppressing the infiltration. Regarding the infiltration depth, since the infiltration rate can be reduced by once irradiating the laminate with an active energy ray, additional irradiation is also effective for the purpose of accelerating the curing for securing the durability of the polarizing plate after suppressing the infiltration depth by temporary irradiation.

The surface of the optical film of the peelable laminated film opposite to the interface on the substrate film side may be hydrophilized by a glow discharge treatment, a corona treatment, an alkali saponification treatment or the like, if necessary.

<Peeling of Substrate Film>

The substrate film can be peeled off as in a peeling step of a separator (peelable film) which is performed for a normal pressure sensitive adhesive attached polarizing plate. The substrate film may be peeled off immediately after the step of laminating the optical film and the polarizer with the adhesive and drying the laminate, or may be separately peeled off in a subsequent step after the laminate is wound once in a roll shape after a drying step.

(Display Device)

The polarizing plate according to the embodiment of the present invention can be used for a liquid crystal display device.

The liquid crystal display device includes a liquid crystal cell and a polarizing plate.

In the liquid crystal display device, the polarizing plate may be arranged in any manner, but it is preferable that the optical film in the polarizing plate is arranged to be closer to the liquid crystal cell than to the polarizer.

The liquid crystal display device further has a backlight and the polarizing plate is preferably arranged on a backlight side or a viewing side. The backlight is not particularly limited and a known backlight can be used. The liquid crystal display device is preferably formed by laminating the backlight, the backlight side polarizing plate, the liquid crystal cell, and the viewing side polarizing plate in order.

For another configuration, any configuration of a known liquid crystal display device can be adopted. The mode of the liquid crystal cell is not particularly limited, and liquid crystal display devices of various display modes such as a liquid crystal cell of twisted nematic (TN) mode, a liquid crystal cell of in-plane switching (IPS) mode, a liquid crystal cell of ferroelectric liquid crystal (FLC) mode, a liquid crystal cell of anti-ferroelectric liquid crystal (AFLC) mode, a liquid crystal cell of optically compensatory bend (OCB) mode, a liquid crystal cell of supper twisted nematic (STN) mode, a liquid crystal cell of vertically aligned (VA) mode, and a liquid crystal cell of hybrid aligned nematic (HAN) mode crystal cell can be configured. Among these, a liquid crystal cell of an IPS mode is preferable.

For another configuration, any configuration of a known liquid crystal display device can be adopted.

EXAMPLES

The present invention will be described in more detail with reference to the following Examples. The materials, amount of use, ratio, details of the treatment, procedures of the treatment, and the like shown in the following Examples can be appropriately changed without departing from the spirit of the present invention. Therefore, it is to be understood that the scope of the present invention should not be interpreted in a limited manner based on the specific examples shown below.

<Preparation of Peelable Laminated Film Having Optical Film A1>

An optical film A1 was formed on a substrate film by the method described below to prepare a peelable laminated film.

1) Preparation of Coating Solution

A coating solution 1 for forming the optical film A1 was prepared with the composition shown below.

2) Composition of Coating Solution 1

SGP-10 (SP value: 19.4 $MPa^{0.5}$) . . . 20.0 parts by mass

EPOCROS RPS-1005 (SP value: 19.3 $MPa^{0.5}$) . . . 49.5 parts by mass

ASAFLEX 810 (SP value: 19.2 $MPa^{0.5}$) 30.0 parts by mass

VYLON 550 . . . 0.2 parts by mass

A-19-1 . . . 0.3 parts by mass

Ethyl acetate . . . 600.0 parts by mass

The obtained coating solution was filtered with a filter having an absolute filtration accuracy of 1 µm to obtain a coating solution 1S.

The materials used are shown below.

SGP-10: polystyrene (manufactured by PS Japan Corporation)

EPOCROS RPS-1005: styrene-oxazoline copolymer (manufactured by Nippon Shokubai Co, Ltd.)

ASAFLEX 810 (manufactured by Asahi Kasei Corporation)

VYLON 550 (manufactured by Toyobo Co., Ltd.)

Fluorine-containing copolymer (A-19-1): prepared in the same manner as in Synthesis Example 22 ([0183] to [0185]) of JP2018-005215A.

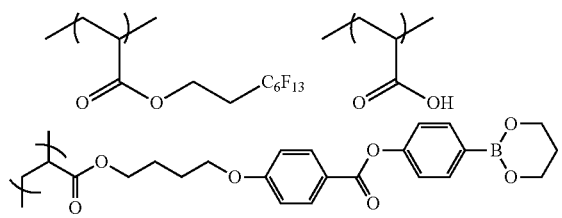

3) Coating of Peelable Laminated Film

A commercially available polyethylene terephthalate film, EMBLET S 38 (film thickness: 38 µm, absorption edge wavelength on the short wavelength side: 310 nm, manufactured by Unitika Ltd.) was used as a substrate film, and the coating solution 1S was used to prepare the optical film A1 to have a film thickness of 5 µm. Thus, a peelable laminated film (film thickness: 43 µm, absorption edge wavelength on the short wavelength side: 310 nm) was obtained. Specifically, the coating solution 1S was applied to the substrate film under the condition of a conveyance speed of 30 m/min by a die coating method using the slot die described in Example 1 of JP2006-122889A. and dried at 105° C. for 30 seconds. Then, the film was wound.

<Preparation of Peelable Laminated Film Having Optical Film A2>

An optical film A2 was formed on the same substrate film as above in the same manner as in the formation of the optical film A1 except that the coating solution 1 for the optical film A1 was changed to the following coating solution 2, and thus a peelable laminated film (film thickness: 43 μm, absorption edge wavelength on the short wavelength side: 310 nm) was obtained.

Composition of Coating Solution 2
AS-70 (SP value: 20.5 MPa$^{0.5}$) . . . 100.0 parts by mass
VYLON 550 . . . 0.9 parts by mass
Surfactant 1 . . . 0.1 parts by mass
Methyl acetate . . . 600.0 parts by mass The obtained coating solution was filtered with a filter having an absolute filtration accuracy of 1 μm.

The materials used are shown below.
AS-70: acrylonitrile-styrene copolymer resin [manufactured by Nippon Steel & Sumikin Chemical Co., Ltd.]
VYLON 550 (manufactured by Toyobo Co., Ltd.)
Surfactant 1: a surfactant having the following structure was used.

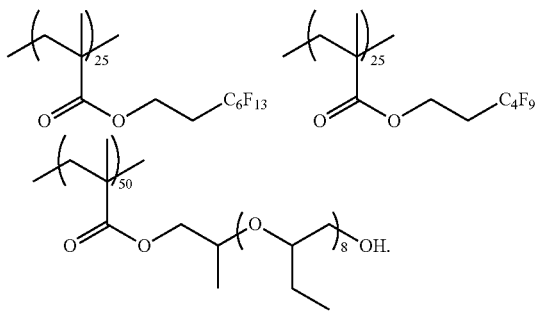

The number of the compositional ratio means wt %

<Preparation of Peelable Laminated Film Having Optical Film A3>

An optical film A3 was formed on the same substrate film as above in the same manner as the formation of the optical film A2 except that the coating solution 2 for the optical film A2 was changed to the following coating solution 3, and thus, a peelable laminated film (film thickness: 43 μm, absorption edge wavelength on the short wavelength side: 310 nm) was obtained.

Composition of Coating Solution 3
AS-70 (SP value: 20.5 MPa$^{0.5}$) . . . 100.0 parts by mass
VYLON 500 . . . 0.9 parts by mass
Surfactant 1 . . . 0.1 parts by mass
Methyl acetate . . . 600.0 parts by mass
Acetonitrile . . . 250.0 parts by mass
Ethanol . . . 50.0 parts by mass The obtained coating solution was filtered with a filter having an absolute filtration accuracy of 1 μm.

The material used is shown below.
VYLON 500 (manufactured by Toyobo Co., Ltd.)

<Preparation of Peelable Laminated Film Having Optical Film A4>

An optical film A4 was formed on the same substrate film as above in the same manner as in the formation of the optical film A3 except that 5.0 parts by mass of SMA2000P (manufactured by Kawahara Yuka Co., Ltd.) was further added to the coating solution 3 for the optical film A3, and thus, a peelable laminated film (film thickness: 43 μm, absorption edge wavelength on the short wavelength side: 310 nm) was obtained.

<Preparation of Peelable Laminated Film Having Optical Film A5>

An optical film A5 was formed on the same substrate film as above in the same manner as in the formation of the optical film A4 except that the amount of the surfactant 1 added to the coating solution 4 for the optical film A4 was changed from 0.1 parts by mass to 0.2 parts by mass, and thus, a peelable laminated film (film thickness: 43 μm, absorption edge wavelength on the short wavelength side: 310 nm) was obtained.

<Preparation of Polarizing Plate>

1) Preparation of Adhesive

A polymerizable compound, an initiator, and a sensitizer were mixed at the composition shown in Table 1 to prepare an adhesive composition. The unit of the content rate of each component in Table 1 is % by mass.

The materials used are shown below.
(Polymerizable Compound)
M1: EPIOL EH-N (2-ethylhexyl glycidyl ether, SP value: 19.5 MPa$^{0.5}$, viscosity: 2 cP) [manufactured by NOF Corporation]
M2: ARONOXETANE OXT-221 (3-ethyl-3-[(3-ethyloxetane-3-yl)methoxymethyl]oxetane, SP value 212 MPa$^{0.5}$, viscosity: 16 cP) [manufactured by Toagosei Co., Ltd.]
M3: RIKA RESIN DME-100 (1,4-cyclohexanedimethanol diglycidylether, SP value: 21.5 MPa$^{0.5}$, viscosity: 78 cP) [manufactured by Shin-Nihon Kagaku Kogyo Co., Ltd.]
M4: CELLOXIDE 2021P (3,4-epoxycyclohexylmethyl-3,4'-epoxycyclohexane carboxylate. SP value: 21.6 MPa$^{0.5}$ viscosity: 282 cP) [manufactured by Daicel Corporation]
(Initiator)
A: CPI-100P (largest maximum absorption wavelength: 305 nm) [manufactured by San-Apro Ltd.]
B: IRGACURE 290 (largest maximum absorption wavelength: 320 nm) [manufactured by BASF SE]
C: CPI-100P/IRGACURE 290=¼ mixture
(Sensitizer)
A: Darocur ITX (largest maximum absorption wavelength: 385 nm) [manufactured by BASF SE]

2) Preparation of Counter Film

According to Example 1 of JP2015-227458A, a polymethyl methacrylate film having a thickness of 60 μm was prepared and used as a counter film A1.

3) Surface Treatment of Film

A corona treatment was performed on the surface of the optical film of the prepared peelable laminated film opposite to the interface of the substrate film side and the counter film A1.

4) Preparation of Polarizer

According to Example 1 of JP2001-141926A, a difference in a circumferential speed was imparted to two pairs of nip rolls, stretching was performed in a longitudinal direction, and thus a polarizer having a thickness 15 μm was prepared.

5) Lamination

Using the polarizer thus obtained, the peelable laminated film including the surface-treated optical film, and the surface-treated counter film A1, the polarizer was sandwiched between the surface-treated surfaces, and then the polarizer and the films were laminated by roll-to-roll processing using the adhesive such that the absorption axis of the polarizer, the optical film, and the longitudinal direction of the counter film A1 were parallel to each other. Subsequently, the laminate was irradiated with ultraviolet rays (UV) with an irradiation dose of 300 mJ/cm$^2$ using an air-cooled metal halide lamp (manufactured by Eye Graphics Co., Ltd.) and cured. At this time, the environmental temperature and required time from lamination to UV irradiation are shown in Table 1 as waiting conditions.

Subsequently, the substrate film of the peelable laminated film was continuously peeled off using a device similar to the peeling device for the separator, and a pressure sensitive adhesive was further applied to prepare a polarizing plate.

6) Evaluation

With respect to the prepared polarizing plate, the infiltration of the adhesive and the external appearance (moisture-heat resistance) of the polarizing plate after a moisture-heat test were evaluated by the following methods. The results are shown in Table 1.

(Evaluation of Infiltration)

The surface of the optical film from which the substrate film was peeled off was measured by ATR-IR to determine the infiltration state of the adhesive. The results are shown in Table 1.

Infiltrated: An absorption peak derived from the adhesive was detected.

Not infiltrated: No absorption peak derived from the adhesive was detected.

(Adhesiveness)

100 polarizing plates were punched with Thomson blade of 40 mm×40 mm and the state of peeling and cracking of the end surface was observed and the adhesiveness was evaluated based on the following standards.

A: No peeling and cracking occurred in the 100 polarizing plates

B: Slight peeling or cracking occurred in 1 or more and less than 5 polarizing plates.

C: Peeling or cracking occurred in 5 or more polarizing plates.

There is no problem in practical use in the standards A and B.

(Evaluation of Moisture-Heat Resistance)

As described below, a moisture-heat test was performed under the conditions of 60'C and a relative humidity of 90% for 500 hours, and the polarizing plate before and after the test was visually observed to evaluate the moisture-heat resistance of the polarizing plate. The external appearance of the polarizing plate after the moisture-heat test was determined as follows for the evaluation standards of the moisture-heat resistance. The results are shown in Table 1.

A: There was no change in the polarizing plate before and after the test.

B: There was a slight change in the polarizing late before and after the test.

C: The polarizing plate after the test had color loss of the polarizing plate and peeling of the film.

TABLE 1

| No | Optical film | Adhesive Polymerizable compound Kind | M1 | M2 | M3 | M4 | ΔSP1 min | Initiator Kind | Added amount [wt %] | Sensitizer Kind | Added amount [wt %] | Waiting conditions Temperature [° C.] | Time [s] | Infiltration | Adhesiveness | Moisture-heat resistance |
|---|---|---|---|---|---|---|---|---|---|---|---|---|---|---|---|---|
| Comparative Example 1 | A1 | A1 | 10 | 0 | 65 | 25 | 0.2 | A | 5 | — | — | 28 | 120 | Infiltrated | A | C |
| Comparative Example 2 | A1 | B1 | 10 | 0 | 20 | 70 | 0.2 | A | 5 | — | — | 28 | 120 | Infiltrated | A | C |
| Example 1 | A1 | B1 | 10 | 0 | 20 | 70 | 0.2 | A | 5 | — | — | 28 | 30 | Not infiltrated | A | B |
| Example 2 | A1 | B2 | 10 | 0 | 20 | 70 | 0.2 | A | 5 | A | 0.5 | 28 | 5 | Not infiltrated | A | A |
| Comparative Example 3 | A1 | B2 | 10 | 0 | 20 | 70 | 0.2 | A | 5 | A | 0.5 | 50 | 30 | Infiltrated | A | C |
| Example 3 | A1 | B2 | 10 | 0 | 20 | 70 | 0.2 | A | 5 | A | 0.5 | 28 | 30 | Not infiltrated | A | A |
| Comparative Example 4 | A1 | B3 | 10 | 0 | 20 | 70 | 0.2 | A | 2.5 | A | 0.5 | 28 | 120 | Infiltrated | A | C |
| Comparative Example 5 | A1 | B4 | 10 | 0 | 20 | 70 | 0.2 | B | 2.5 | — | — | 28 | 120 | Infiltrated | A | C |
| Example 4 | A1 | B5 | 10 | 0 | 20 | 70 | 0.2 | B | 5 | — | — | 28 | 30 | Not infiltrated | A | A |
| Comparative Example 6 | A1 | C1 | 0 | 50 | 25 | 25 | 1.9 | A | 2.5 | — | — | 28 | 120 | Infiltrated | A | C |
| Comparative Example 7 | A1 | C2 | 0 | 50 | 25 | 25 | 1.9 | B | 2.5 | — | — | 28 | 120 | Infiltrated | A | C |
| Example 5 | A1 | C2 | 0 | 50 | 25 | 75 | 1.9 | B | 2.5 | — | — | 28 | 30 | Not infiltrated | A | A |
| Example 6 | A1 | D1 | 0 | 0 | 25 | 75 | 2.2 | A | 5 | — | — | 28 | 120 | Not infiltrated | A | B |
| Example 7 | A1 | D2 | 0 | 0 | 25 | 75 | 2.2 | A | 5 | A | 0.5 | 28 | 120 | Not infiltrated | A | A |
| Example 8 | A1 | D3 | 0 | 0 | 25 | 75 | 2.2 | B | 5 | — | — | 28 | 30 | Not infiltrated | B | A |
| Example 9 | A1 | B6 | 10 | 0 | 20 | 70 | 0.2 | B | 2.5 | — | — | 28 | 30 | Not infiltrated | A | B |
| Example 10 | A1 | B7 | 10 | 0 | 20 | 70 | 0.2 | B | 2.5 | A | 1 | 28 | 30 | Not infiltrated | A | A |
| Example 11 | A1 | B8 | 10 | 0 | 20 | 70 | 0.2 | C | 2.5 | A | 1 | 28 | 30 | Not infiltrated | A | A |
| Example 12 | A1 | B8 | 10 | 0 | 20 | 70 | 0.2 | C | 5 | A | 1 | 28 | 30 | Not infiltrated | A | A |
| Example 13 | A2 | B1 | 10 | 0 | 20 | 70 | 1.0 | C | 5 | A | 1 | 28 | 30 | Not infiltrated | A | A |
| Example 14 | A3 | B1 | 10 | 0 | 20 | 70 | 1.0 | C | 5 | A | 1 | 28 | 30 | Not infiltrated | A | A |
| Example 15 | A4 | B1 | 10 | 0 | 20 | 70 | 1.0 | C | 5 | A | 1 | 28 | 30 | Not infiltrated | A | A |
| Example 16 | A5 | B1 | 10 | 0 | 20 | 70 | 1.0 | C | 5 | A | 1 | 28 | 30 | Not infiltrated | A | A |

As seen from Table 1 above, the polarizing plates of Examples had good durability

INDUSTRIAL AVAILABILITY

According to the present invention, it is possible to provide a polarizing plate having a high adhesiveness between a polarizer and an optical film and having excellent durability even in a high temperature and high humidity environment or the like.

While the present invention has been described with reference to the detailed or specific embodiments, those skilled in the art ill recognize that various changes or modifications can be made without departing from the spirit and scope of the present invention.

What is claimed is:

1. A polarizing plate comprising:
a polarizer; and
an optical film,
wherein the optical film is laminated on at least one surface of the polarizer with an adhesive containing at least one or more polymerizable compounds, and the at least one or more polymerizable compounds are not substantially infiltrated into the optical film, and
wherein a content rate of a polymerizable compound having a difference in SP value of less than 0.3 MPa$^{0.5}$ with respect to a main component of the optical film among the at least one or more polymerizable compounds is less than 50% by mass with respect to the adhesive, the SP value being determined by Hoy's method.

2. The polarizing plate according to claim 1,
wherein a minimum value of a difference between an SP value of the at least one or more polymerizable compounds determined by Hoy's method and an SP value of a main component of the optical film determined by Hoy's method is 0.3 MPa$^{0.5}$ or more.

3. The polarizing plate according to claim 1,
wherein the at least one or more polymerizable compounds contain at least one or more cationic polymerizable compounds.

4. The polarizing plate according to claim 2,
wherein the at least one or more polymerizable compounds contain at least one or more cationic polymerizable compounds.

5. The polarizing plate according to claim 1,
wherein a main component of the optical film has an SP value of 20 MPa$^{0.5}$ or less, the SP value being determined by Hoy's method.

6. The polarizing plate according to claim 2,
wherein a main component of the optical film has an SP value of 20 MPa$^{0.5}$ or less, the SP value being determined by Hoy's method.

7. The polarizing plate according to claim 3,
wherein a main component of the optical film has an SP value of 20 MPa$^{0.5}$ or less, the SP value being determined by Hoy's method.

8. The polarizing plate according to claim 1,
wherein a peelable substrate film is provided on a surface of the optical film, opposite to a side on which the adhesive is provided,
the adhesive contains at least one or more photoinitiators, and
among absorption peaks of the at least one or more photoinitiators, a maximum absorption wavelength on a longest wavelength side is longer than an absorption edge wavelength on a short wavelength side of a peelable laminated film in which the optical film and the peelable substrate film are laminated.

9. The polarizing plate according to claim 1,
wherein a peelable substrate film is provided on a surface of the optical film, opposite to a side on which the adhesive is provided,
the adhesive contains at least one or more photoinitiators,
among absorption peaks of the at least one or more photoinitiators, a maximum absorption wavelength on a longest wavelength side is equal to or shorter than an absorption edge wavelength on a short wavelength side of a peelable laminated film in which the optical film and the peelable substrate film are laminated, and
the adhesive contains a sensitizer.

10. The polarizing plate according to claim 8,
wherein the adhesive contains at least two photoinitiators, and at least one of the at least two photoinitiators is a photoinitiator in which the maximum absorption wavelength on the longest wavelength side is longer than the absorption edge wavelength on the short wavelength side of the peelable laminated film among the absorption peaks of the at least two photoinitiators.

11. The polarizing plate according to claim 9,
wherein a main component of the peelable substrate film is a polyester resin.

12. A method for manufacturing the polarizing plate according to claim 1, the method comprising:
laminating the optical film on the polarizer with the adhesive to provide a laminate and then irradiating the laminate with an active energy ray.

13. A method for manufacturing the polarizing plate according to claim 8, the method comprising:
laminating a surface of the optical film, opposite to an interface on a peelable substrate film side, on the polarizer with the adhesive to provide a laminate, then irradiating the laminate with an active energy ray from the peelable substrate film side, and further, peeling off the peelable substrate film.

14. The method for manufacturing the polarizing plate according to claim 12,
wherein the optical film and the adhesive are brought into contact with each other and after 0.1 to 30 seconds, the laminate is irradiated with the active energy ray.

* * * * *